United States Patent
Manning (10) Patent No.: US 6,366,991 B1
(45) Date of Patent: Apr. 2, 2002

(54) METHOD AND APPARATUS FOR COUPLING SIGNALS BETWEEN TWO CIRCUITS OPERATING IN DIFFERENT CLOCK DOMAINS

(75) Inventor: Troy A. Manning, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/447,075

(22) Filed: Nov. 22, 1999

Related U.S. Application Data (63) Continuation of application No. 08/948,712, filed on Oct. 10, 1997, now Pat. No. 6,000,022.

(51) Int. Cl.⁷ .............................................. G06F 13/14
(52) U.S. Cl. ....................................................... 711/167
(58) Field of Search ................................ 711/104, 105, 711/167; 710/52; 713/400, 401; 327/144; 375/354

(56) References Cited

U.S. PATENT DOCUMENTS

| | | | |
|---|---|---|---|
| 4,873,703 A | 10/1989 | Crandall et al. | 375/118 |
| 5,086,500 A | 2/1992 | Greub | 395/550 |
| 5,138,637 A * | 8/1992 | Fox | 375/372 |

(List continued on next page.)

FOREIGN PATENT DOCUMENTS

| | | |
|---|---|---|
| EP | 0 547 768 A2 | 6/1993 |
| EP | 0 678 990 A2 | 10/1995 |
| EP | 0 798 630 A1 | 10/1997 |
| WO | WO 97/06491 | 2/1997 |

OTHER PUBLICATIONS

Descriptive literature entitled, "400MHz SLDRAM, 4M×16 SLDRAM Piplined, Eight Bank, 2.5 V Operation," SLDRAM Cosortium Advance Sheet, published throughout the United States, pp. 1–22.

"Draft Standard for a High–Speed Memory Interface (SyncLink)," Microprocessor and Microcomputer Standards Subcommittee of the IEEE Computer Society, Copyright 1996 by the Institute of Electrical and Electronics Engineers, Inc. New York, NY, pp. 1–56.

*Primary Examiner*—Kevin L. Ellis
(74) *Attorney, Agent, or Firm*—Dorsey & Whitney LLP (57) ABSTRACT

A coupling circuit for coupling a first signal generated in a first circuit operating in a first clock domain to a second circuit operating in a second clock domain. The coupling circuit includes a first gate for coupling the first signal to a first logic circuit unless the coupling circuit has already applied a signal to the second circuit. The first logic circuit includes a pair of second gates that are enabled by respective rising and falling edges of the first clock signal. Thus, each of the second gates generates an output signal on respective transitions of the first clock signal as long as the first gate is coupling the first signal to the first logic circuit. The first logic circuit also includes a pair of latches coupled to respective outputs of the second gates. Each of the latches is set by its respective second gate generating the output signal. The second logic gates are coupled to a second logic circuit having a pair of third gates that are enabled by respective rising and falling edges of the second clock signal. Thus, each of the second gates generates an output signal on respective transitions of the second clock signal if the latch to which it is connected is generating an output signal. The output signal is also used as the reset signal to disable the first gate and reset the latches. Since the output signal is generated on the first transition of the first clock signal after the first signal is applied to the coupling circuit, the coupling circuit generates a single output signal that is synchronized to the second clock signal.

12 Claims, 10 Drawing Sheets

U.S. PATENT DOCUMENTS

| | | | |
|---|---|---|---|
| 5,179,667 A | 1/1993 | Iyer | 395/275 |
| 5,285,483 A | 2/1994 | Ogawa et al. | 375/120 |
| 5,448,715 A | 9/1995 | Lelm et al. | 395/550 |
| 5,455,935 A | 10/1995 | Taylor et al. | 395/550 |
| 5,509,038 A | 4/1996 | Wicki | 375/371 |
| 5,548,620 A * | 8/1996 | Rogers | 375/354 |
| 5,692,166 A | 11/1997 | Milhizer et al. | 395/551 |
| 5,754,838 A | 5/1998 | Shibata et al. | 395/559 |
| 5,781,765 A | 7/1998 | Alexander | 395/558 |
| 5,796,995 A | 8/1998 | Nasserbakht et al. | 395/558 |
| 5,828,870 A | 10/1998 | Gunadisastra | 395/558 |
| 5,867,695 A | 2/1999 | Amini et al. | 395/558 |
| 5,884,099 A * | 3/1999 | Klingelhofer | 710/52 |
| 5,896,347 A | 4/1999 | Tomita et al. | 365/233 |
| 5,953,284 A | 9/1999 | Baker et al. | 365/233 |
| 5,963,502 A | 10/1999 | Watanabe et al. | 365/233 |
| 6,003,118 A | 12/1999 | Chen | 711/167 |
| 6,029,252 A | 2/2000 | Manning | 713/556 |
| 6,058,152 A | 5/2000 | Tanishima | 375/376 |
| 6,081,142 A | 6/2000 | Douchi et al. | 327/158 |
| 6,081,904 A | 6/2000 | Chencinski et al. | 713/400 |
| 6,087,867 A * | 7/2000 | Holm | 327/144 |
| 6,097,775 A | 8/2000 | Weber | 375/354 |
| 6,112,307 A | 8/2000 | Ajanovic et al. | 713/400 |
| 6,163,545 A * | 12/2000 | Flood et al. | 370/465 |
| 6,172,540 B1 * | 1/2001 | Gandhi | 327/145 |

* cited by examiner

Fig. 1
*(PRIOR ART)*

CLKA

CLKB

*Fig. 2D*

CLKB

Fig. 10

METHOD AND APPARATUS FOR COUPLING SIGNALS BETWEEN TWO CIRCUITS OPERATING IN DIFFERENT CLOCK DOMAINS

CROSS-REFERENCE TO RELATED APPLICATION

This application is a continuation of U.S. patent application Ser. No. 08/948,712, filed Oct. 10, 1997, now U.S. Pat. No. 6,000,002.

TECHNICAL FIELD

This invention relates to coupling signals from one electronic device to another, and more particularly to coupling signals between electronic devices having different clock domains defined by respective clocks that may differ from each other.

BACKGROUND OF THE INVENTION

Many electronic devices operate in a synchronous manner in which the timing of signals in the device are controlled by a clock signal. The transitions of the clock signal occur at substantially the same time throughout the circuit, thereby ensuring that signals coupled or created responsive to the transitions of the clock signal are properly synchronized to each other.

Although synchronism between signals can be maintained when the same clock signal, or clock signals derived from the same clock signal, are used throughout a circuit. It is substantially more difficult to properly synchronize signals coupled from one electronic device to another when the electronic devices operate in different clock domains defined by different clock signals.

Figure 1:
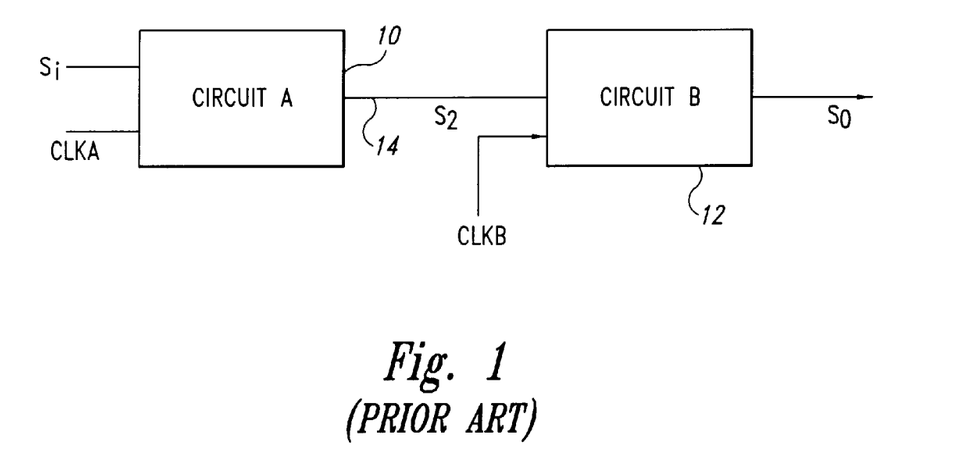
FIG. 1 is a block diagram of a conventional pair of electronic devices operating in two different clock domains.

With reference to FIG. 1. a first electronic device 10 receives a signal $S_i$ and a clock signal CLKA. The electronic device outputs a signal $S_2$ responsive to the input signal $S_i$ and transitions of the clock signal CLKA. The signal $S_2$ is coupled to the input of a second electronic device 12 through a line 14. The second electronic device 12 also receives a second clock signal CLKB. The second clock signal CLKB may have a phase that is different from the phase of the first clock signal CLKA, and it may even have a frequency that is different from the frequency of the first clock signal CLKA. The problem encountered when coupling the signal $S_2$ from the output of the first device 10 to the input of the second device 12 is illustrated in FIG. 2.

Figure 2A:
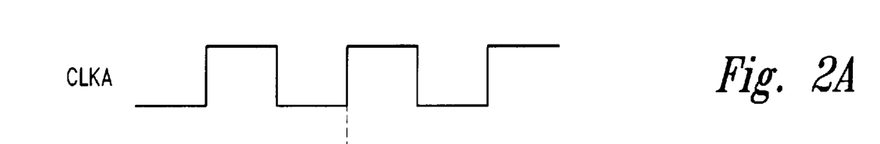
Figure 2B:
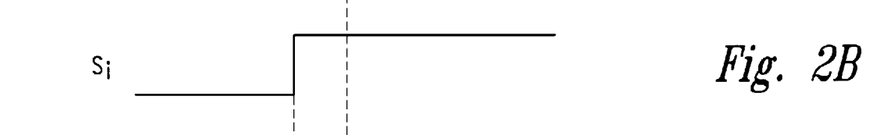
Figure 2C:
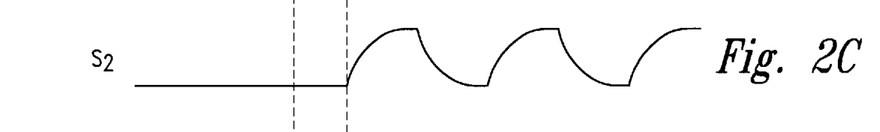

The clock signal CLKA for the first electronic device 10 is shown in FIG. 2A, and the input signal $S_i$ is shown in FIG. 2B as going high at time $t_0$. By way of example, the first electronic device 10 simply performs a logical AND function of the input signal $S_i$ and the clock signal CLKA to generate the signal $S_2$. The signal $S_2$ is shown in FIG. 2C with exponentially rising and falling edges because of the capacitive loading on the line 14 coupling the first electronic device 10 to the second electronic device 12.

Figure 2D:
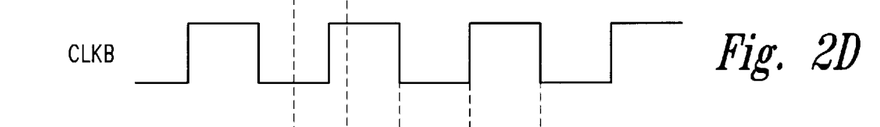

An example of a clock signal $CLKB_1$ having a first phase is illustrated in FIG. 2D. As shown by comparing FIG. 2A with FIG. 2D, the clock signal CLKA for the first electronic device 10 lags the clock signal $CLKB_1$ for the second electronic device 12. By way of example, it is assumed that the second electronic device 14 simply functions to clock the signal $S_2$ (FIG. 2C) on either the rising edge of the clock signal $CLKB_1$ (FIG. 2F) or the falling edge of the clock signal $CLKB_1$ (FIG. 2G). As shown in FIG. 2F, the second electronic device 12 is incapable of detecting the signal $S_2$ when the device 12 is clocked on the rising edge of $CLKB_1$ because the signal $S_2$ is not present at the input to the electronic device 12 on the rising edge of $CLKB_1$. However, as shown in FIG. 2G, the second electronic device 14 is able to detect the signal $S_2$ if the electronic device 12 clocks the signal $S_2$ on the falling edge of the clock signal $CLKB_1$. Thus, the second electronic device 12 can function with the first electronic device 10 despite having different clock domains, but only as long as the clock signal $CLKB_1$ leads the clock signal CLKA. If the electronic device 12 clocks the signal $S_2$ on the falling edge of $CLKB_1$, it will not be able to detect the signal $S_2$ if the clock signal CLKB lags the clock signal CLKA.

Figure 2E:
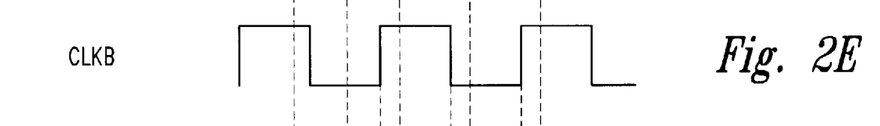
Figure 2F:
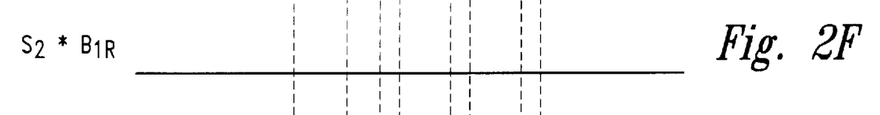
Figure 2G:
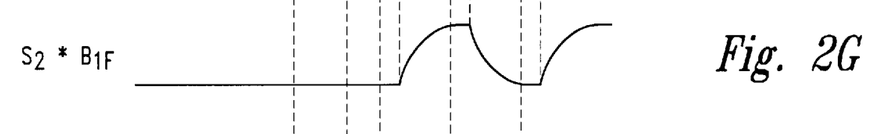
Figure 2H:
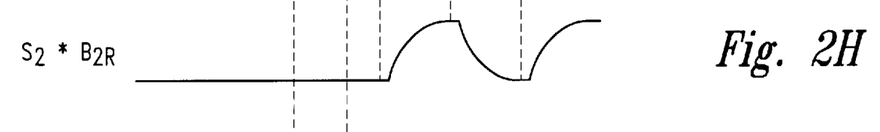
Figure 2I:
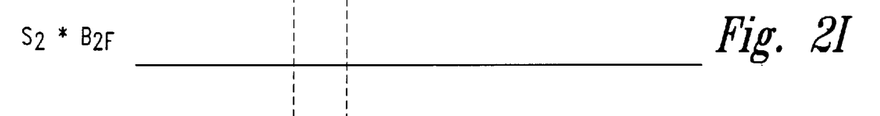

An example of a clock signal $CLKB_2$ that lags the clock signal CLKA is illustrated in FIG. 2E. The first clock signal CLKA is considered to lag the second clock signal CLKB if any transition of the first clock signal CLKA occurs more than 0 degrees and less than 180 degrees after the corresponding transition of the second clock signal CLKB. The first clock signal CLKA is considered to leasd the second clock signal CLKB if any transition of the first clock signal CLKA occurs more than 180 degrees and less than 0 degrees after the corresponding transition of the second clock signal CLKB. Again. it is first assumed that the second electronic device 12 functions to clock the signal $S_2$ on the rising edge of the clock signal $CLKB_2$ (FIG. 2H) or the falling edge of the clock signal $CLKB_2$ (FIG. 2I). As shown in FIG. 2H, the second electronic device 12 is able to detect the signal $S_2$ if the electronic device 12 clocks the signal $S_2$ on the rising edge of the clock signal $CLKB_2$. However, as shown in FIG. 2I. the second electronic device 12 is incapable of detecting the signal $S_2$ if the electronic device 12 clocks the signal on the falling edge of the clock signal $CLKB_2$ because the signal $S_2$ is not present at the input to the electronic device 12 on the falling edge of the clock signal $CLKB_2$.

It will be apparent from the above discussion that the second electronic device 12 is able to detect the signal $S_2$ generated by the first electronic device 10 as long as either the second clock signal CLKB leads the first clock signal CLKA and the second electronic device 12 clocks the signal $S_2$ on the falling edge of CLKB, or the second clock signal CLKB lags the first clock signal and the second electronic device 12 clocks the signal $S_2$ on the rising edge of CLKB. However, because the first and second electronic devices 10, 12, respectively, are operating in different clock domains, the phase relationship between CLKA and CLKB can change. Therefore, if the choice is made to make the second electronic device 12 clock the signal $S_2$ on the falling edge of CLKB. it is possible for the clock signal CLKB to lag the first clock signal CLKA. As explained above, the second electronic device 12 will be unable to detect the signal $S_2$ under these conditions. Similarly, if the choice is made for the second electronic device 12 to clock the signal $S_2$ on the rising edge of CLKB, it is possible for the clock signal CLKB to lead the first clock signal CLKA. Again. the second electronic device 12 will be unable to detect the signal $S_2$.

Figure 3:
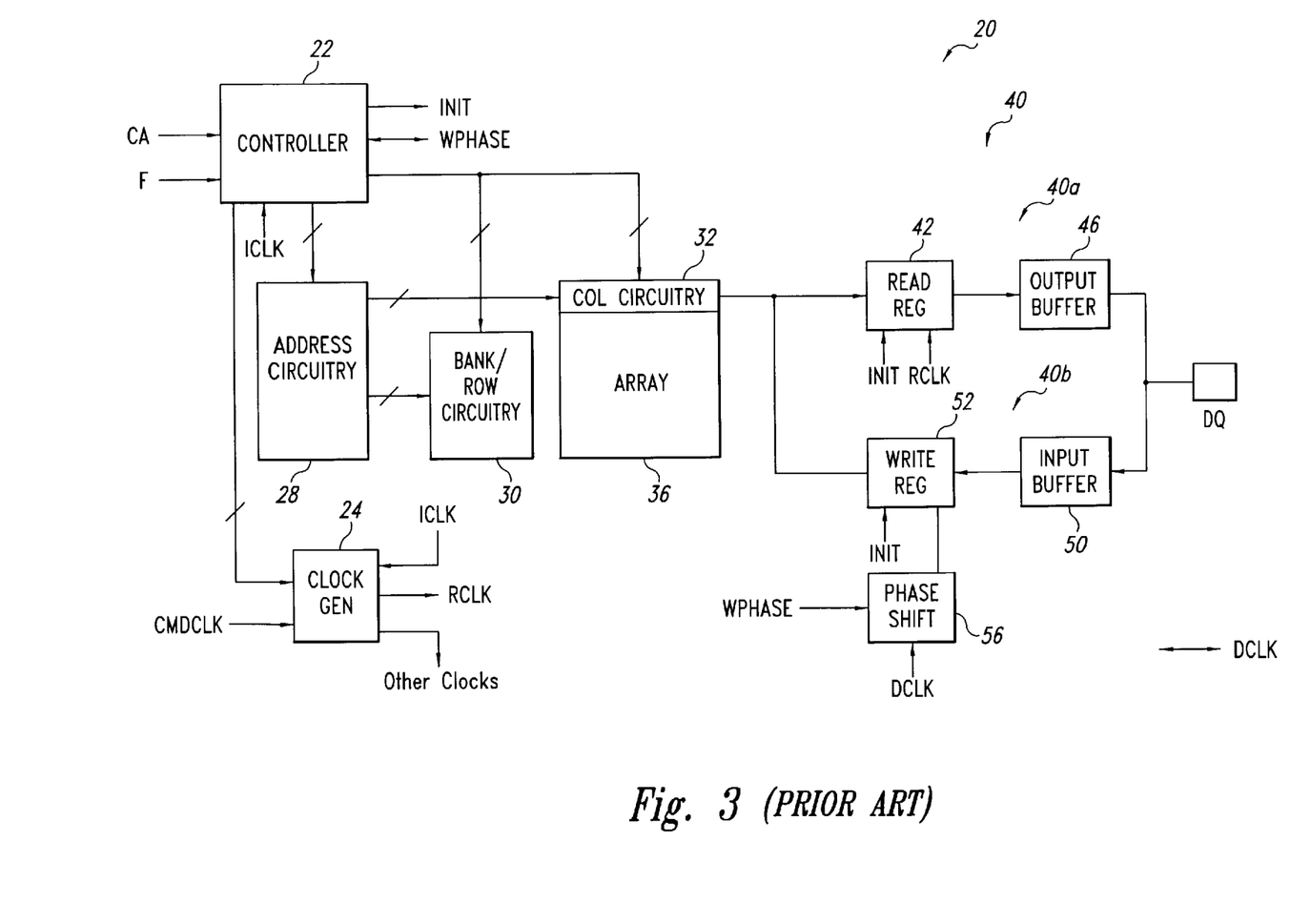
FIG. 3 is a block diagram of a conventional memory device that operates in two clock domains.

A more concrete example of the problem illustrated FIGS. 1 and 2 is exemplified by a memory device 20 shown in FIG. 3. The memory device 20 illustrated in FIG. 3 is a packetized dynamic random access memory ("DRAM") having an architecture known as SyncLink. However, the problem may also exist to varying degrees with other types of memory devices, such as synchronous DRAMs. The packetized memory device 20 is shown in somewhat generalized form because the specific structure of the memory device 20 is somewhat peripheral to the inventions described herein.

However, packetized memory devices 20 are explained in greater detail in the U.S. patent applications Ser. Nos. 08/877,191 and 08/874,690.626 to Troy A. Manning which are incorporated herein by reference.

The memory device 20 includes a controller 22 that receives a command packet CA, generally containing several multi-bit packet words, a flag signal F indicating the start are a command packet, and a command clock CMD-CLK synchronized to the packet words. The command packet CA includes both memory commands, such as read, write, etc., and bank, row and column address information, as well as other information used to initialize or operate the memory device 20.

The memory device 20 also includes a clock generator 24 that receives the command clock CMDCLK as well as control signals from the controller 22. The clock generator 24 produces several clock signals from the command clock CMDCLK, including an internal clock signal ICLK and a read clock signal RCLK. The phase of the internal clock signal ICLK and the phase of the read clock signal RCLK are determined by control signals from the controller 22. The controller 22 uses the internal clock signal ICLK to generate an initiate signal INIT to start the transfer of read data out to the memory device 20 and write data into the memory device 20. The controller 22 also generates a write phase command signal WPHASE that is used in a manner to be explained below.

Address portions of the command packet CA are coupled to address circuitry 28. The address circuitry 28 then applies bank and row addresses to bank/row circuitry 30 and column addresses to column circuitry 32. The structure and operation of this circuitry 30, 32 is well known to one skilled in the art. Basically, the bank/row circuitry 30 selects a memory array 36 or a portion of a memory array 36, and a row of memory cells in that array. The column circuitry 32 selects a column of memory cells in the array, and data is written to or read from the memory cell in the selected row than intersects the selected column.

Data are coupled between an externally accessible data bus terminal DQ and the column circuitry 32 through a data path 40 that includes a read data path 40a and a write data path 40b. The read data path 40a includes a read register 42 and an output buffer 46 that couple read data from the array 36 via the column circuitry 32 to the data bus terminal DQ. The write data path 40b includes an input buffer 50 and a write register 52 that couple write data from the data bus terminal DQ to the array 36 via the column circuitry 32. During a read operation, read data are applied to a data input of the read register 42 and clocked through the read register 42 by the read clock signal RCLK after the initiate signal INIT from the controller 22 has transitioned active high. During a write operation, write data are applied to the write register 52 and clocked through the write register 52 by a clock signal from a phase shift circuit 56 after the initiate signal INIT has transitioned active high. The phase shift circuit 56 generates the clock signal from a data clock signal DCLK applied to the memory device 20 from an external device, such as a memory controller (not shown). The phase of the clock signal applied to the write register 52 relative to the phase of the data clock DCLK is controlled by the phase command signal WPHASE from the controller 22.

In operation, an external device, such as a memory controller. provides a command packet CA to the memory device 20 to set the timing of the read clock RCLK relative to the command clock CMDCLK. Thus, the phase of the read clock RCLK is controlled by the external device. In a similar manner, the phase of the data clock signal DCLK is determined by the external device, such as a memory controller, generating the data clock signal DCLK. In this manner, the external device controls the timing of the memory device 20 applying read data to the external device.

The memory device 20 shown in FIG. 3, when coupled to external devices, such as memory controllers, must operate in two clock domains. The first clock domain is defined by the internal clock signal ICLK, which corresponds to the timing of the control signals from the controller 22. Thus, the functions carried out by the controller 22, such as receiving data from and outputting data to the array 36, and initiating data transfers responsive to the initiate signals INIT, are in the first clock domain. The coupling of data through the read register 42 is in a second clock domain because the coupling of signals through the read register 42 is controlled by the read clock signal RCLK, and the phase of the read clock RCLK is determined by the external device. Similarly. the coupling of signals through the write register 52 is in the second clock domain because the coupling of signals through the write register 52 is controlled by the data clock signal DCLK, and the phase of the data clock signal DCLK is determined by the external device. Operation of the memory device 20 in two clock domains can cause problems of the type explained above with reference to FIGS. 1 and 2. In fact, it is particularly difficult to avoid such problems when operating at the high data rates that are the goal of the SyncLink packetized DRAM.

There is therefore a need to provide a method and apparatus that is capable of coupling signals from a first electronic device to a second electronic device, and to allow first and second electronic devices to operate together, despite the first and second electronic devices being in different clock domains.

SUMMARY OF THE INVENTION

A method and apparatus for applying a second signal to a second device operating in a second clock domain defined by a second clock signal responsive to a first signal received from a first device operating in a first clock domain defined by a first clock signal. A first logic circuit receives the first signal and the first clock signal. The first logic circuit generates an intermediate signal responsive to each transition of the first clock signal subsequent to the first signal being received unless a reset signal is being applied to the first logic circuit. A second logic circuit to receives the second clock signal and the intermediate signal from the first logic circuit. The second logic circuit generates the second signal responsive to a transition of the second clock signal subsequent to the intermediate signal being generated. The second logic circuit also generates the reset signal responsive to the second signal. As a result, the second signal is generated responsive to a transition of the second clock signal subsequent to a transition of the first clock signal after receipt of the first signal.

BRIEF DESCRIPTION OF THE DRAWINGS

FIGS. 2 and 2A to 2I are timing diagrams illustrating signals present in the electronic devices of FIG. 1.

DETAILED DESCRIPTION OF THE INVENTION

Figure 4:
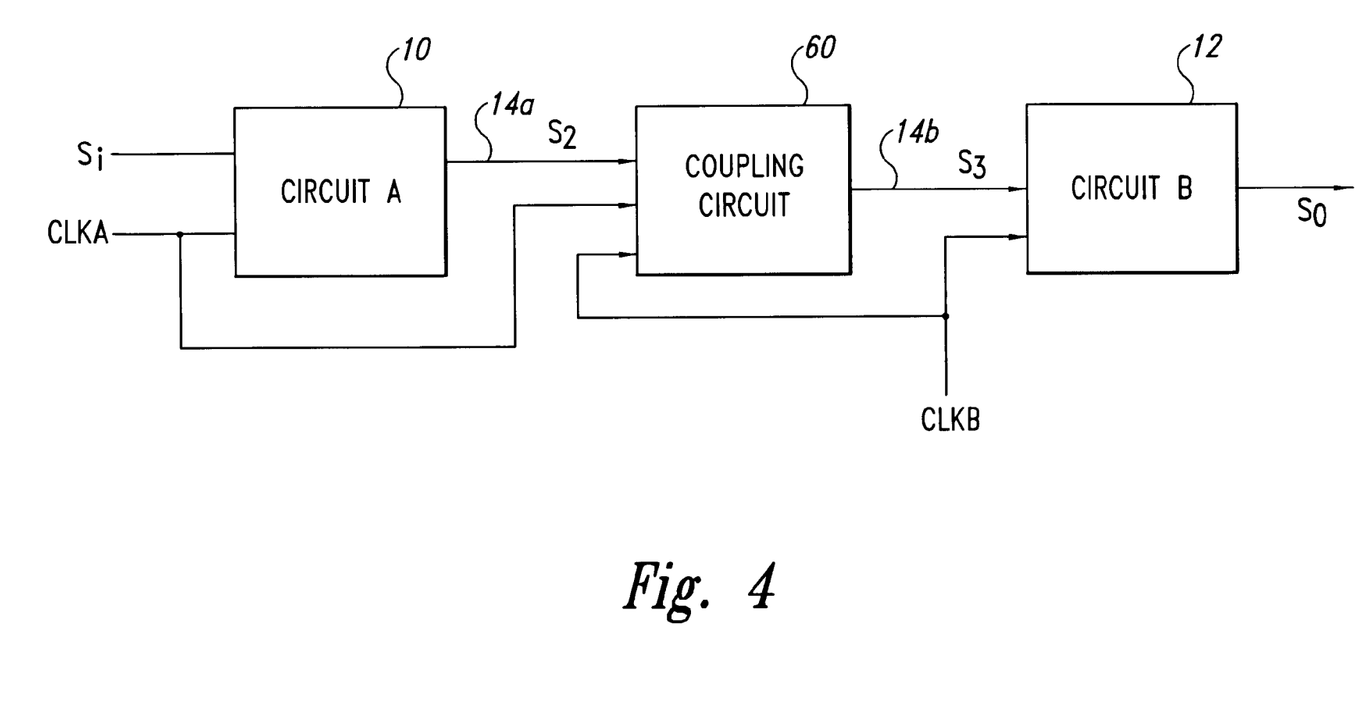
FIG. 4 is a exemplary embodiment of a coupling circuit in accordance with the invention used to interconnect the electronic devices of FIG. 1.

A block diagram of an exemplary embodiment of a coupling circuit 60 in accordance with one embodiment of the invention is illustrated FIG. 4. The coupling circuit 60 illustrated in FIG. 4 receives the signal $S_2$ produced by the first electronic device 10 on line 14a, as well as the first and second clock signals CLKA and CLKB. The coupling circuit 60 thus receives clock signals defining the clock domains of both the first electronic device 10 and the second electronic device 12. In response to the signal $S_2$ and the rising edge, the falling edge or both the rising and falling edges of the first clock signal CLKA, the coupling circuit 60 outputs a signal $S_3$ on line 14b to the second electronic device 12. The signal $S_3$ is applied to the second electronic device 12 responsive to the rising edge, the falling edge, or both the rising and falling edges of the second clock signal CLKB. The signal $S_3$ is preferably applied to the second electronic device 12 on the first transition of CLKB following the first transition of CLKA after the input signal $S_i$ becomes active.

Figure 5:
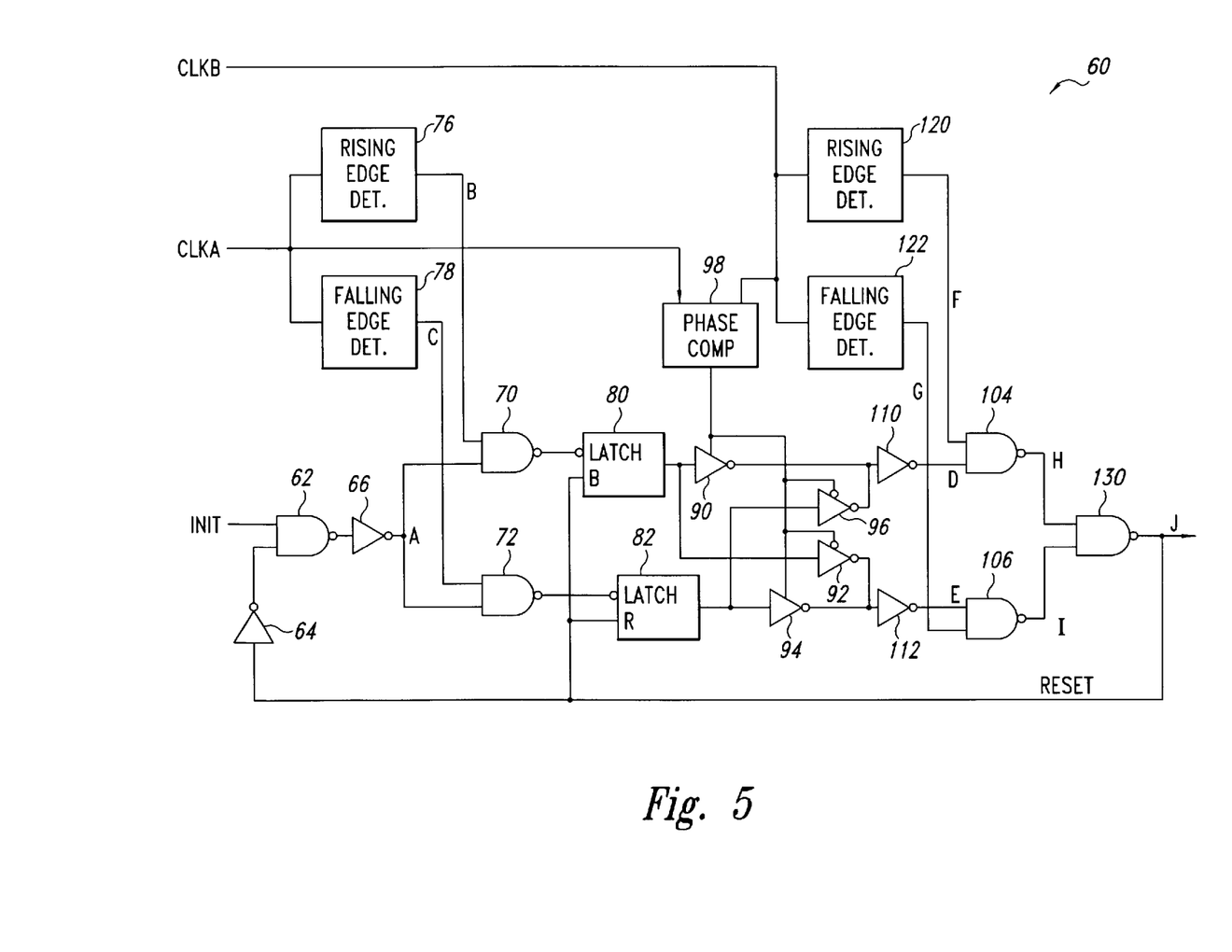
FIG. 5 is a block diagram and logic diagram showing the coupling circuit of FIG. 4 in greater detail.
Figure 6A:
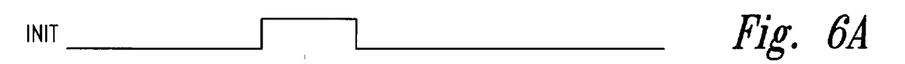
FIGS. 6A to 6T are timing diagrams illustrating signals present in the coupling circuit of FIG. 5.
Figure 6B:
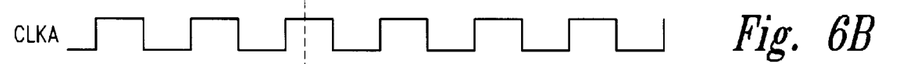
Figure 6C:
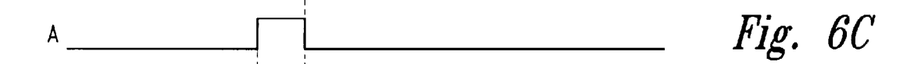
Figure 6D:
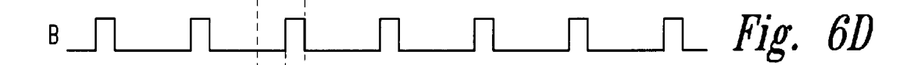
Figure 6E:
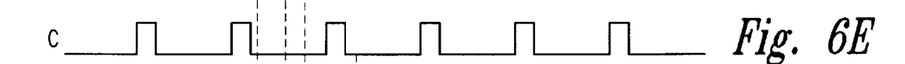

An embodiment of the coupling circuit 60 is shown in greater detail in FIG. 5 and explained with reference to the timing diagram of FIG. 6. The initiate signal INIT is applied to a NAND gate 62. The initiate signal INIT is shown in FIG. 6A, and the first clock signal CLKA, defining the first clock domain is shown in FIG. 6B. As shown in FIG. 6A, the initiate signal INIT transitions active high at time $t_0$. As explained below, the output of the coupling circuit 60 is low prior to the initiate signal INIT becoming active high. As a result, the NAND gate 62 is enabled by a high at the output of an inverter 64 when the initiate signal INIT transitions high. In response to the high initiate signal INIT, the NAND gate 62 outputs a low thereby causing an inverter 64 to output a high, as shown in FIG. 6C. The high at the output of the inverter 66 enables a pair of NAND gates 70, 72. The NAND gates 70, 72 also receive respective outputs from a rising edge detector 76 and a falling edge detector 78. The rising edge detector 76 and the falling edge detector 78 each receive the clock signal CLKA defining the first clock domain. The structure and operation of these edge detectors 76, 78 will be explained in detail below. As shown in FIG. 6D, the rising edge detector 76 outputs a positive—going pulse responsive to each rising edge of the clock signal CLKA. Similarly, as shown in FIG. 6E, the falling edge detector 78 outputs a positive—going pulse responsive to each falling edge of the clock signal CLKA.

The outputs of the NAND gates 70,72 are applied to respective latches 80, 82. The latches 80, 82 are reset by a high output of the coupling circuit 60 which, as explained above, is assumed to be low at this time. The output of the latch 80 is applied to a first pair of inverters 90, 92, while the output of the latch 82 is similarly applied to a second pair of inverters 94, 96. The outputs of the inverters 90, 96 are coupled to an inverter 110 while the outputs of the inverters 92, 94 are coupled to an inverter 112. The signals at the outputs of the inverters 110, 112 are shown in FIGS. 6F and 6G, respectively.

Figure 6F:
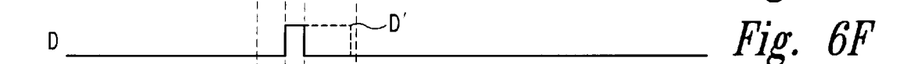
Figure 6G:
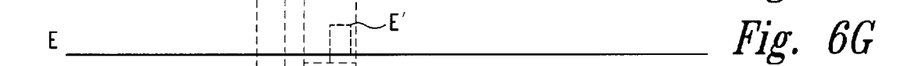

As shown in FIG. 6F, the output of the inverter 110 goes high at $t_1$ responsive to the latch 80 being set by the NAND gate 70 when the NAND gate 70 receives a pulse from the rising edge detector 76 after the output of the inverter 66 goes high. The signals at the outputs of the inverters 110, 112 are thus intermediate signals that are generated with the timing of the first clock domain. These intermediate signals are then available for processing by the second clock signal CLKB in the second clock domain, as explained below.

The inverters 90–96 output a high impedance unless they are enabled by appropriate signals applied to their enable inputs. More specifically, the inverters 90, 94 are enabled by a high enable signal while the inverters 96, 92 are enabled by a low enable signal. Thus, either both inverters 90, 94 are enabled or both inverters 92, 96 are enabled. The inverters 90–96 are enabled by the output of a phase comparison circuit 98, the structure and operation of which will be explained below. For the present, it will be assumed that the output of the phase comparison circuit 98 is high, thereby enabling the inverters 90, 94. Thus, in response to a high at the output of each latch 80, 82, the inverters 90, 94 output a low that enable a respective pair of NAND gates 104, 106 through respective inverters 110, 112.

Figure 6H:
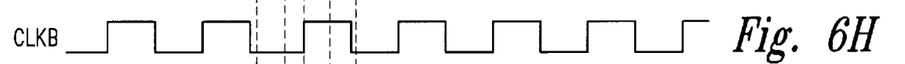
Figure 6I:
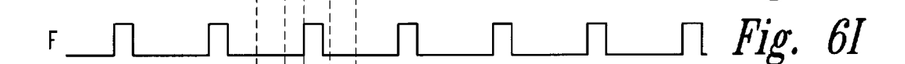
Figure 6J:
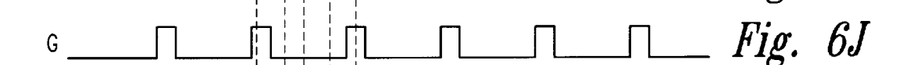
Figure 6K:
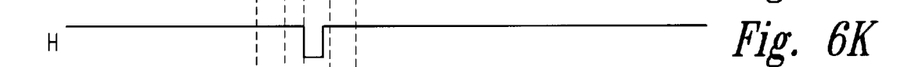
Figure 6L:
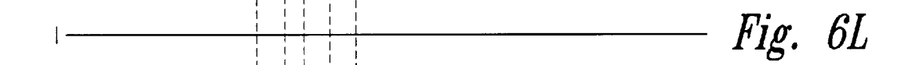
Figure 6M:
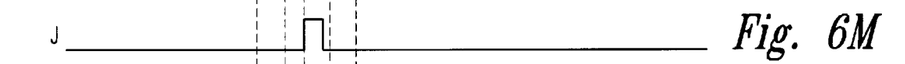
Figure 6N:
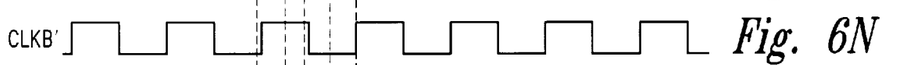

The NAND gate 104 receives an output from a rising edge detector 120 that receives the clock signal CLKB defining the second clock domain. The clock signal CLKB is shown in FIG. 6H as lagging the first clock signal CLKA. The rising edge detector 120 operates in the same manner as the rising edge detector 76. Thus, as illustrated in FIG. 6I, the rising edge detector 120 applies a positive—going pulse to the NAND gate 104 on each rising edge of CLKB. Similarly, as illustrated in FIG. 6J, the falling edge detector 122, like the falling edge detector 78, applies a positive—going pulse to the NAND gate 106 on each falling edge of CLKB. The pulses at the output of the NAND gates 104 are then combined by a NAND gate 130, which outputs the pulses from both NAND gates 104, 106 as the output of the coupling circuit 60. The output of the NAND gate 130 is coupled to the output of the coupling circuit 60. The signal generated at the output of the coupling circuit 60 is shown in FIG. 6M.

As mentioned above, the output of the coupling circuit 60 is fed back to the NAND gate 62, and it also resets the latches 80, 82. Thus, when the NAND gate 130 outputs its first pulse at time $t_2$, the NAND gate 62 is disabled and the latches 80, 82 are reset. The latches 80, 82 thereafter output a low, thereby disabling the NAND gates 104, 106. Consequently, the coupling circuit 60 generates a single pulse on any transition of the second clock signal CLKB after any transition of the first clock signal CLKA following the initiate signal INIT. Moreover, it will perform this function regardless of the phase or frequency relationship between the first clock signal CLKA and the second clock signal CLKB.

Figure 6O:
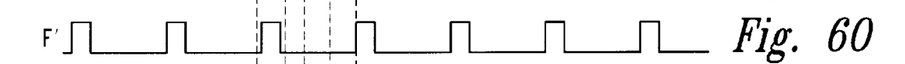
Figure 6P:
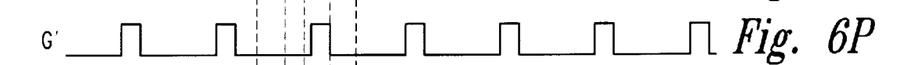
Figure 6Q:
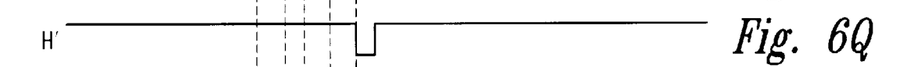

The operation of the coupling circuit 60 for a second clock signal CLKB (FIG. 6N) leading the first clock signal CLKA is shown in FIGS. 6N–6Q. The operation of the coupling circuit 60 is the same as explained above up to the NAND gates 104, 106 since it is only the second clock signal CLKB that has changed, and CLKB is connected to the coupling circuit at the NAND gates 104, 106. Thus, as before, the input to the NAND gate 104 goes high at $t_1$. However, since the second clock signal CLKB leads rather than lags the first clock signal CLKA, the output of the NAND gate 104 does not go low at $t_2$ because, as shown in FIG. 6O, the pulse from the rising edge detector 120 was generated prior to $t_2$. Further, the output of the NAND gate 106 does not go low at $t_3$ because the pulse from the falling edge detector 122 was generated prior to $t_3$. Instead, as shown in FIG. 6Q, it is not until $t_4$ that the next pulse from the rising edge detector 120 causes the output of the NAND gate 104 to go low. A delay of this magnitude from the setting of one of the latches 80, 82 to the output of the coupling circuit 60 going high is unacceptable. It is for this reason that the phase comparator 98 is used, as explained below.

The phase comparator 98 generates an output indicative of whether the second clock signal CLKB leads or lags the first clock signal CLKA. When the second clock signal CLKB lags the first clock signal CLKA, the output of the phase comparator 98 is high, thereby enabling the inverters 90, 94. The coupling circuit 60 then operates as explained above with reference to FIGS. 6A–6M. When the second clock signal CLKB leads the first clock signal CLKA, the output of the phase comparator 98 is low, thereby enabling the inverters 92, 96. The coupling, circuit 60 then operates as explained below with reference to FIGS. 6N–P, and 6R–T. The design of the phase comparator 98 is well within the ability of one skilled in the art, and a detailed description of its structure and operation will thus be omitted for purposes of brevity.

Figure 6R:
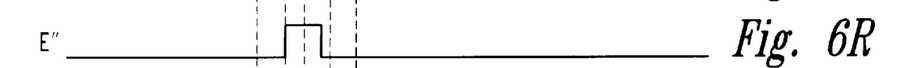
Figure 6S:
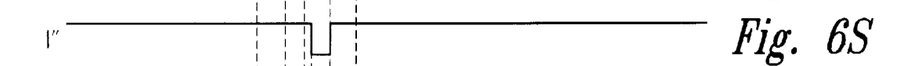
Figure 6T:
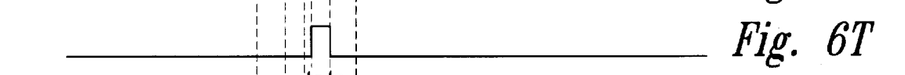

With reference to FIGS. 6N–P, and 6R–T, when the output of the latch 80 goes high at $t_2$, the output is coupled through the inverter 92 because the inverter 92, rather than the inverter 90, is enabled by the low from the phase comparator 98. The input to the NAND gate 106 thus goes high at $t_2$, as shown in FIG. 6R. Similarly, the output of the latch 82 is coupled through the inverter 96 rather than through the inverter 94. As a result, the input to the NAND gate 104 would go high at $t_3$ if the latch 82 had not been reset by the output of the coupling circuit 60. As shown in FIG. 6S, the output of the NAND gate 106 goes low at $t_5$, thereby causing the output of the coupling circuit to go high, as shown in FIG. 6T. By refuting the outputs of the latches 80, 82 depending on whether the second clock signal CLKB leads or lags the first clock signal CLKA, the coupling circuit 60 is able to generate an output signal with a consistently small delay.

Figure 7:
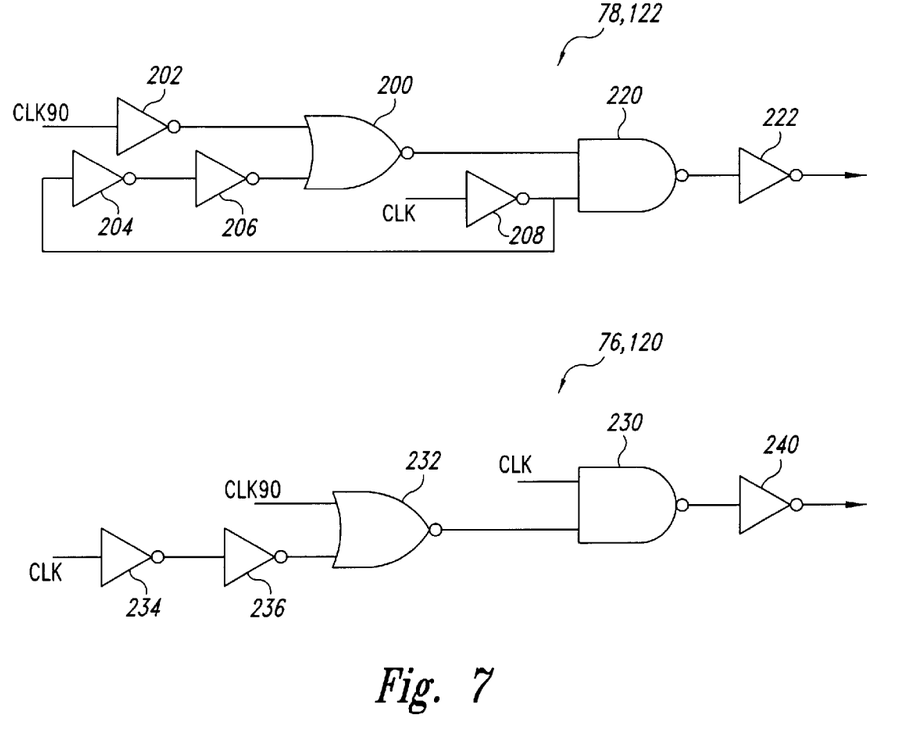
FIG. 7 are logic diagrams showing rising and falling edge detectors used in the coupling circuit of FIG. 5.
Figure 8A:
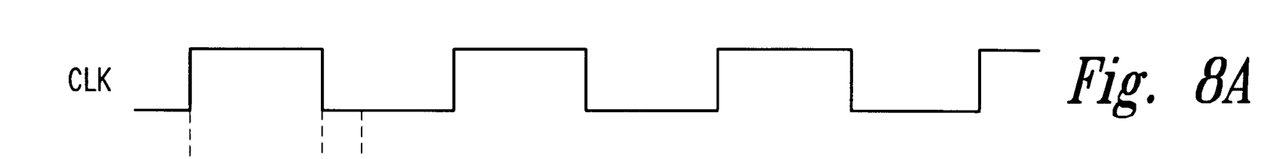
FIG. 8 is a timing diagram illustrating signals present in the rising and falling edge detectors of FIG. 7.
Figure 8B:
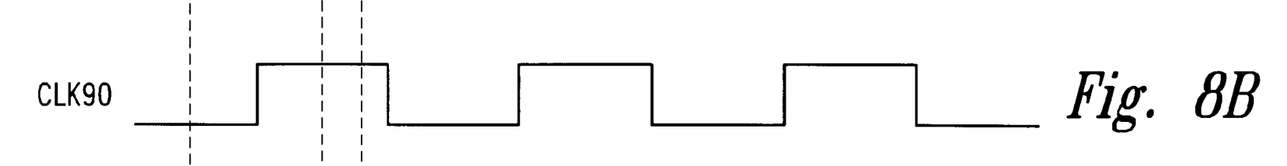
Figure 8C:
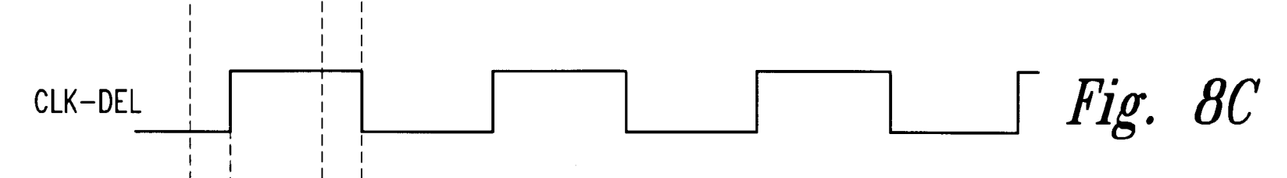
Figure 8D:
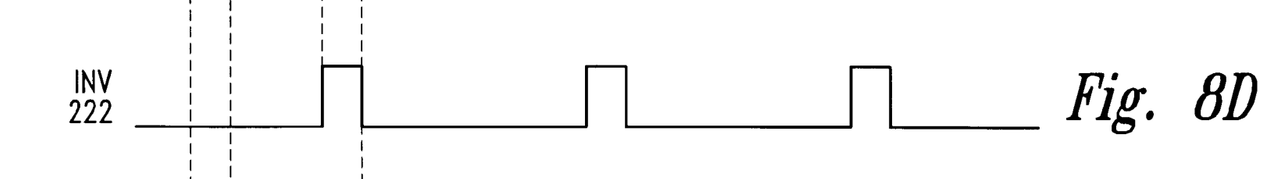
Figure 8E:
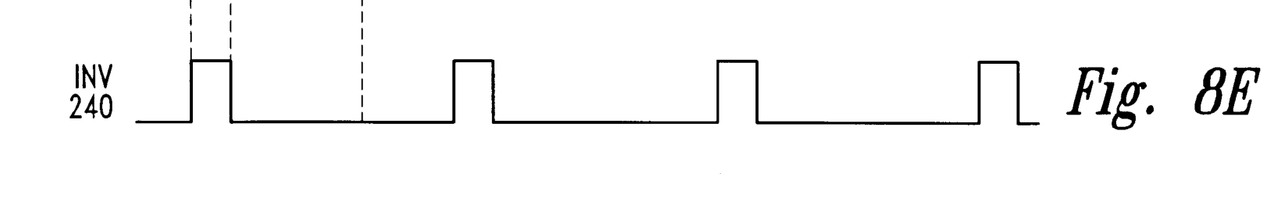

The rising edge detectors 76, 120 and the falling edge detectors 78, 122 are shown in FIG. 7, and their operating will be explained with reference to the timing diagram of FIG. 8.

The falling edge detectors 78, 122 each includes a NOR gate 200 that receives a CLK90* signal generated by passing the CLK90 signal through an inverter 202. The CLK and CLK90 signals are generated by conventional circuits outside of the coupling circuit 60. The CLK signal is shown in the first line and the CLK90 signal is shown in the second line of FIG. 8. The NOR gate 200 also receives the output of a pair of inverters 204, 206, which, in turn, is driven by the output of an inverter 208 that receives the CLK signal. The inverters 204–208 delay the CLK signal to produce a CLK-DEL signal shown in the third line of FIG. 8. The output of the NOR gate 200 goes high whenever CLK90 is high and whenever CLK-DEL. The output of the NOR gate 200 is applied to a NAND gate 220, which also receives a CLK* signal from the inverter 316. The output of the NAND gate 220 drives an inverter 222. The output of the inverter 222 is high when all of its inputs to the NAND gate 220 are high. Thus, as shown in the fourth line of FIG. 8, the output of the inverter 222 is low when the CLK90 signal is high, CLK-DEL is high, and the CLK signal is low. As shown in FIG. 8, these signal conditions exist just after the falling edge of the CLK signal. Thus, the inverter 222 outputs a positive—going pulse responsive to each falling edge of the CLK signal.

The rising edge detectors 76, 120 each include a NAND gate 230 which receives the CLK signal and the output of a NOR gate 232. The NOR gate 232, in turn, receives the CLK90 signal and the CLK signal after being delayed by a pair of inverters 234, 236. The NAND gate 230 drives an inverter 240 high goes high when the CLK signal is high, the CLK90 signal is low, and the CLK-DEL is low. As fifth line of FIG. 8, these signal conditions are met just after the rising edge of CLK. Thus, the inverter 240 outputs a positive—going pulse responsive to each rising edge of the CLK signal.

Figure 9:
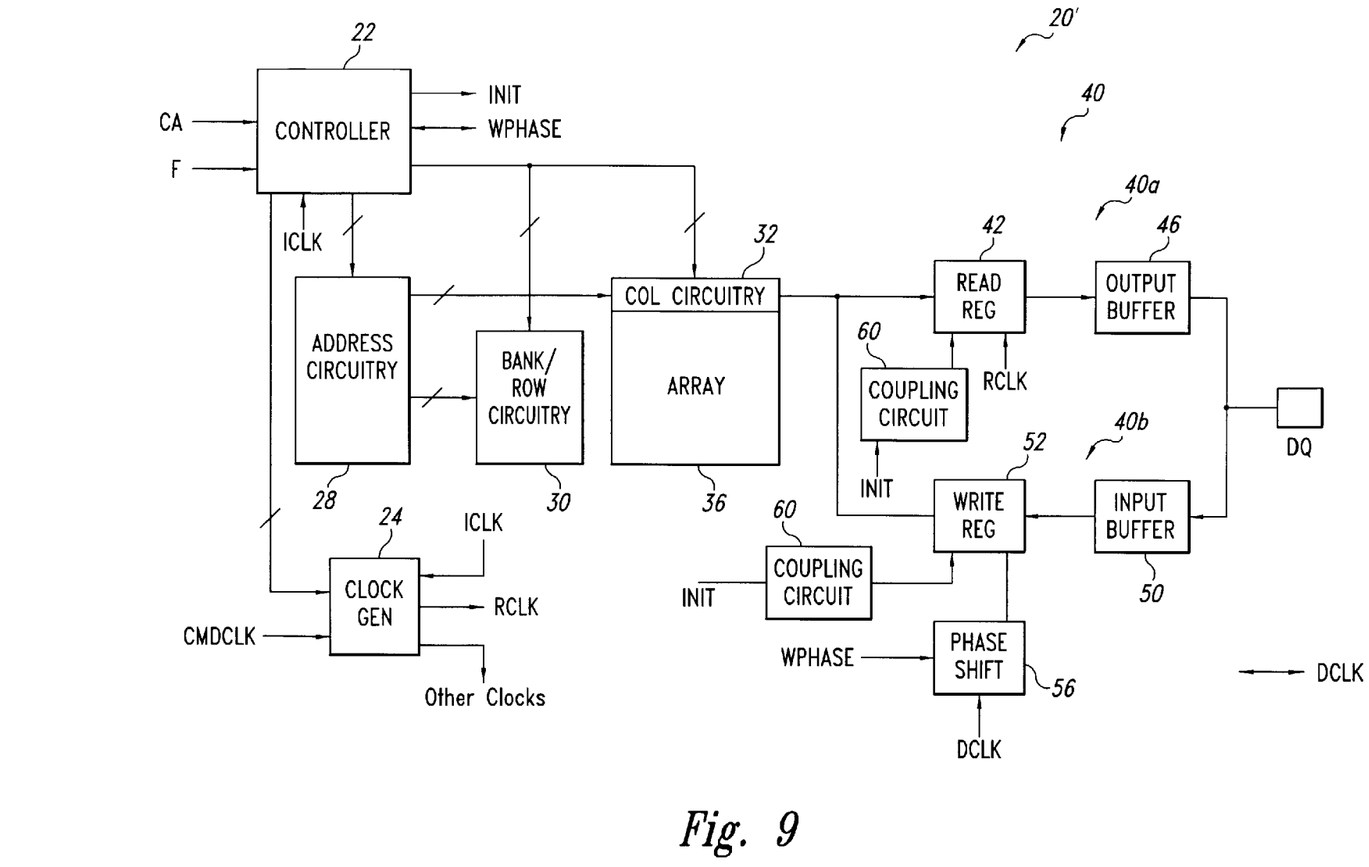
FIG. 9 is a block diagram of a memory device using the coupling circuit of FIG. 5.

The coupling circuit 60 may be advantageously used in the memory device 20 of FIG. 3. With reference to FIG. 9, the memory device 20' uses the same components as the memory device 20 of FIG. 3 and operates in the same manner except as explained below. Thus, in the interests of brevity, the same components in both memory devices 20, 20' have been provided with the same reference numerals, and a detailed explanation of the operation of the memory device 20' will be omitted.

The memory device 20' of FIG. 9 uses one coupling circuit 60 to couple the initiate signal INIT to the read register 42, and another coupling circuit 60 to couple the initiate signal INIT to the write register 52. As explained above, the initiate signal INIT is generated in a first clock domain since its timing is controlled internally and not by an external device. As also explained above, the read clock RCLK and the data clock DCLK are in a second clock domain since their timing is controlled by an external device, such as a memory controller, even though the read clock signal RCLK is generated internally. The coupling circuits 60 thus receive respective input signals in the first clock domain, and generate respective output signals in the second clock domain.

Figure 10:
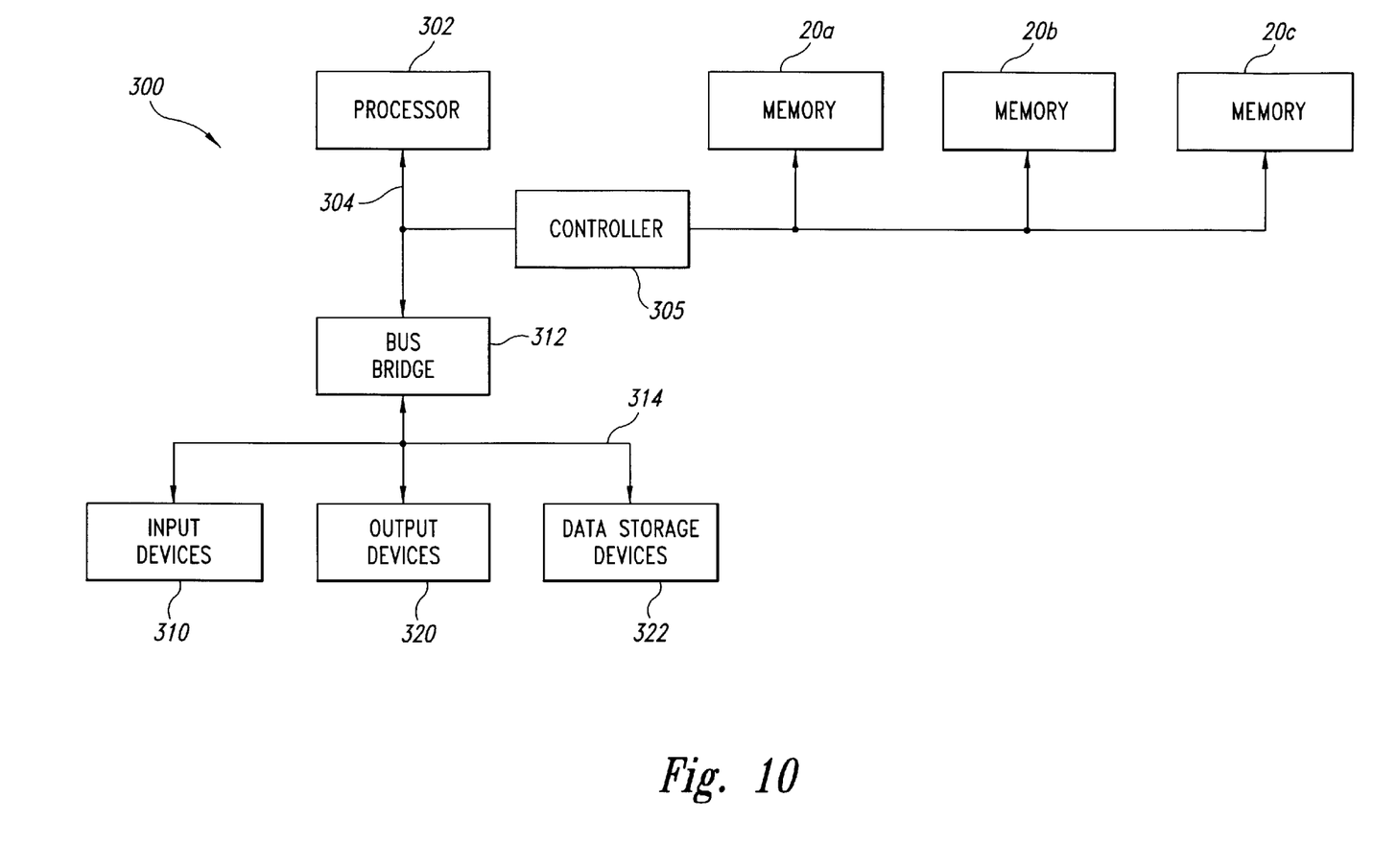
FIG. 10 is a block diagram of a computer system using the memory device of FIG. 9.

The memory device 20' can be used in a computer system, as shown in FIG. 10. With reference to FIG. 10, the computer system 300 includes a processor 302 having a processor bus 304 coupled through a memory controller 305 to three memory devices which may be packetized dynamic random access memory or SyncLink DRAMs ("SLDRAM") 20a–c.

The computer system 300 also includes one or more input devices 310, such as a keypad or a mouse, coupled to the processor 302 through a bus bridge 312 and an expansion bus 314, such as an industry standard architecture ("ISA") bus or a Peripheral component interconnect ("PCI") bus. The input devices 310 allow an operator or an electronic device to input data to the computer system 300. One or more output devices 320 are coupled to the processor 302 to display or otherwise output data generated by the processor 302. The output devices 320 are coupled to the processor 302 through the expansion bus 314, bus bridge 312 and processor bus 304. Examples of output devices 320 include printers and video display units. One or more data storage devices 322 are coupled to the processor 302 through the processor bus 304, bus bridge 312, and expansion bus 314 to store data in or retrieve data from storage media (not shown). Examples of storage devices 322 and storage media include fixed disk drives floppy disk drives tape cassettes and compact-disk read-only memory drives.

In operation, the processor 302 communicates with the memory devices 20a–c via the memory controller 305. The memory controller 305 sends the memory devices 20a–c command packets that contain both control and address information. Data is coupled between the processor 302 and the memory devices 20a–c, through the memory controller 305 and a data bus portion of the processor bus 304. The memory controller 305 applies write data from the processor 302 to the memory devices 20a–c, and it applies read data from the memory devices 20a–c to the processor 302. In reading data from the memory devices 20a–c, the memory controller 305 also provides the memory devices 20a–c with timing information to adjust the timing of the read clock and/or data clock signals RCLK, DCLK, respectively. Although all the memory devices 20a–c are coupled to the memory controller 305, only one memory device 20a–c at a time reads or writes data, thus avoiding bus contention. Bus contention is avoided by each of the memory devices 20a–c and the bus bridge 312 having a unique identifier, and the command packet contains an identifying code that selects only one of these components.

The computer system 300 also includes a number of other components and signal lines which have been omitted from FIG. 10 in the interests of brevity. For example as explained above, the memory devices 20a–c also receive a command or master clock signal to provide internal timing signals, and a data clock signal clocking data into and out of the memory device 20.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of coupling a first signal from a first device operating in one clock domain defined by a first clock signal to a second device operating in a second clock domain defined by a second clock signal having the same frequency as the frequency of the first clock signal, the method comprising:
   generating an intermediate signal from the first signal responsive to a transition of the first clock signal;
   generating an output signal from the intermediate signal responsive to a subsequent transition of the second clock signal;
   in response to generating the output signal, suppressing at least one subsequent intermediate signal from being generated from the first signal responsive to a subsequent transitions of the first clock signal; and
   applying the output signal to the second device.

2. The method of claim 1 wherein the step of suppressing at least one subsequent intermediate signal from being generated from the intermediate signal comprises suppressing a subsequent intermediate signal from being generated from the intermediate signal responsive to the first transition of the first clock signal following the intermediate signal being generated.

3. The method of claim 1 wherein the step of generating the output signal from the intermediate signal comprises using the intermediate signal as the output signal.

4. An apparatus for applying a second signal to a second device operating in a second clock domain defined by a second clock signal responsive to a first signal received from a first device operating in a first clock domain defined by a first clock signal having the same frequency as the frequency of the second clock signal, the apparatus comprising:
   a first logic circuit coupled to receive the first signal and the first clock signal, the first logic circuit generating an intermediate signal responsive to each transition of the first clock signal subsequent to the first signal being received unless a reset signal is being applied to the first logic circuit;
   a second logic circuit coupled to the first logic circuit to receive the intermediate signal and the second clock signal, the second logic circuit generating the second signal responsive to a transition of the second clock signal subsequent to the intermediate signal being generated, the second logic circuit generating the reset signal responsive to the second signal.

5. The apparatus of claim 4 wherein the first logic circuit comprises:
   a third logic circuit to receive the first signal and the reset signal, the third logic circuit generating an output signal responsive to the first signal unless the reset signal is being applied to the third logic circuit;
   a clocking circuit generating enable pulses responsive to respective transitions of the first clock signal; and
   a fourth logic circuit coupled to receive the output signal of the third logic circuit and the enable pulses from the first clocking circuit, the fourth logic circuit generating the intermediate signal responsive to receiving the output signal from the third logic circuit and one of the enable pulses.

6. The coupling circuit of claim 5 wherein the fourth logic circuit further comprises a latch circuit continuously generating the intermediate signal responsive to receiving the output signal from the third logic circuit and one of the enable pulses until the second logic circuit generates the reset signal.

7. The coupling circuit of claim 4 wherein the second logic circuit comprises:
   a clocking circuit generating enable pulses responsive to respective transitions of the second clock signal; and
   a third logic circuit coupled to receive the intermediate signal from the first logic circuit and the enable pulses from the clocking circuit, the third logic circuit generating the second signal responsive to receiving the intermediate signal from the first logic circuit and one of the enable pulses.

8. A coupling circuit for coupling a first signal from a first device operating in one clock domain defined by a first signal to a second device operating in a second clock domain defined by a second clock signal having the same frequency as the frequency of the first clock signal, the coupling circuit comprising:
   a first clocking circuit generating first enable pulses responsive to respective transitions of the first clock signal;
   a second clocking circuit generating second enable pulses responsive to respective transitions of the second clock signal;
   a first gating circuit generating an intermediate signal responsive to receiving the first signal from the first device and one of the first enable pulses from the first clocking circuit, the first gating circuit comprising a latch circuit generating the immediate signal until the latch is reset, the latch circuit being reset responsive to an output signal; and
   a second gating circuit applying the output signal to the second device responsive to receiving the intermediate signal from the first circuit and one of the second enable pulses from the second clocking circuit.

9. A method coupling an input signal from the first clock domain defined by a first clock signal to a second clock domain defined by a second clock signal having a frequency that is equal to the frequency of the first clock signal, the method comprising:

generating a first signal responsive to a transition of the first clock signal having a first polarity after receiving the input signal;

generating a second signal responsive to a transition of the first clock signal having a second polarity after receiving the input signal;

comparing the phase of the first signal to the phase of the second clock signal;

if the phases of the first and second clock signals are such that the first clock signal leads the second clock signal, generating an output signal responsive to the earlier of a transition of the second clock signal having the first polarity after the first signal is generated or a transition of the second clock signal having the second polarity after the second signal is generated; and if the phases of the first and second clock signals are such that the first clock signal lags the second clock signal, generating the output signal responsive to the earlier of a transition of the second clock signal having the first polarity after the second signal is generated or a transition of the second clock signal having the polarity after the first signal is generated.

10. The method of claim 9 further comprising suppressing the first and second signals from being generated after the output signal has been generated.

11. A method of coupling an input signal from the first clock domain defined by a first clock signal to a second clock domain defined by a second clock signal having a frequency that is equal to the frequency of the clock signal, the method comprising:

generating an intermediate signal responsive to a transition of the first clock signal after receiving the input signal;

generating an output signal responsive to a transition of the second clock signal after the intermediate signal is generated; and suppressing the intermediate signal from being generated after the output signal has been generated.

12. The method of claim 11, wherein the set of generating an intermediate signal responsive to a transition of the first clock signal after receiving the input signal comprises generating the intermediate signal responsive to a transition of the first clock signal having a first polarity after receiving the input signal, and wherein the act of generating an output signal responsive to a transition of the second clock signal after the intermediate signal is generated comprises generating an output signal responsive to a transition of the second clock signal having the first polarity after the intermediate signal is generated.

* * * * *